US012747139B2

(12) United States Patent
Sun et al.

(10) Patent No.: US 12,747,139 B2

(45) Date of Patent: Sep. 29, 2026

(54) CRANE AND CONTROL METHOD FOR SLEWING AND TRAVELING OF A CRANE UNDER NO LOAD WHILE HAVING A SUPER-LIFT COUNTERWEIGHT

(71) Applicant: XCMG Construction Machinery Co., Ltd. Building Machinery Co., Xuzhou (CN)

(72) Inventors: Li Sun, Xuzhou (CN); Ying Sun, Xuzhou (CN); Jiangping Zhao, Xuzhou (CN); Lei Han, Xuzhou (CN); Xiqing Liu, Xuzhou (CN); Jinjun Meng, Xuzhou (CN); Jihai Yang, Xuzhou (CN); Haijun Chen, Xuzhou (CN)

(73) Assignee: XCMG CONSTRUCTION MACHINERY CO., LTD. BUILDING MACHINERY CO., Xuzhou (CN)

( * ) Notice: Subject to any disclaimer, the term of this patent is extended or adjusted under 35 U.S.C. 154(b) by 58 days.

(21) Appl. No.: 18/277,954

(22) PCT Filed: Dec. 29, 2021

(86) PCT No.: PCT/CN2021/142388

§ 371 (c)(1),
(2) Date: Aug. 18, 2023

(87) PCT Pub. No.: WO2022/227665

PCT Pub. Date: Nov. 3, 2022

(65) Prior Publication Data

US 2024/0124275 A1 Apr. 18, 2024

(30) Foreign Application Priority Data

Apr. 28, 2021 (CN) ........................ 202110465902.2

(51) Int. Cl.

*B66C 23/76* (2006.01)
*B66C 13/16* (2006.01)
*B66C 13/18* (2006.01)

(52) U.S. Cl.

CPC .............. *B66C 23/76* (2013.01); *B66C 13/16* (2013.01); *B66C 13/18* (2013.01)

(58) Field of Classification Search

CPC .......... B66C 23/76; B66C 23/82; B66C 23/62
See application file for complete search history.

(56) References Cited

U.S. PATENT DOCUMENTS 5,005,714 A 4/1991 Kroll et al.
7,546,928 B2 6/2009 Pech et al.

(Continued)

FOREIGN PATENT DOCUMENTS

CN 200951937 Y 9/2007
CN 102862921 A 1/2013

(Continued)

OTHER PUBLICATIONS

PCT International Search Report of Commonly Owned International Patent Application PCT/CN2021/142388, mailed Mar. 28, 2022, 6 pages, International Searching Authority (CN).

(Continued)

*Primary Examiner* — Robert W Hodge
*Assistant Examiner* — Juan J Campos, Jr.
(74) *Attorney, Agent, or Firm* — ADELI LLP

(57) ABSTRACT

The present application relates to the field of lifting equipment, in particular to a crane and a control method thereof. The crane includes: a body including a chassis and a turntable being rotatably arranged on the chassis; a super-lift device including a super-lift jib, a suspension pulling member and a balancing mechanism, the balancing mechanism including a super-lift counterweight and a pushing device, (Continued)

first ends of the super-lift jib and the pushing device being both connected to the turntable, the suspension pulling member being connected to a second end of the super-lift jib and the super-lift counterweight, a second end of the pushing device being connected to the super-lift counterweight to adjusting a distance between the super-lift counterweight and a slewing center of the turntable; and a hovering device configured to support the super-lift counterweight above a ground when the crane is under no load, a first end of the hovering device being connected to the turntable and a second end of the hovering device being not connected to the super-lift jib. Based on this, the function of slewing and traveling of the crane under no load while carrying the super-lift counterweight is achieved more conveniently.

18 Claims, 6 Drawing Sheets

(56) References Cited

U.S. PATENT DOCUMENTS

| | | | | |
|---|---|---|---|---|
| 2008/0203045 | A1* | 8/2008 | Pech | B66C 23/76 212/196 |
| 2013/0020273 | A1 | 1/2013 | Chen et al. | |
| 2015/0246795 | A1* | 9/2015 | Copeland | E02F 9/18 212/197 |
| 2021/0009386 | A1 | 1/2021 | Pech et al. | |
| 2023/0202809 | A1 | 6/2023 | Chen et al. | |

FOREIGN PATENT DOCUMENTS

| | | | |
|---|---|---|---|
| CN | 102530746 | A | 7/2014 |
| CN | 102718160 | A | 7/2014 |
| CN | 203946817 | U | 11/2014 |
| CN | 204079324 | U | 1/2015 |
| CN | 103787197 | A | 9/2015 |
| CN | 103253602 | A | 12/2015 |
| CN | 106115517 | A | 12/2017 |
| CN | 106542445 | A | 10/2018 |
| CN | 111217264 | A | 6/2020 |
| CN | 211946021 | U | 11/2020 |
| CN | 112408218 | A | 2/2021 |
| CN | 113148863 | A | 7/2021 |
| CN | 113148864 | A | 7/2021 |
| DE | 202011002674 | U1 | 5/2012 |
| DE | 102016110033 | A1 | 11/2017 |
| EP | 0354167 | A1 | 2/1990 |
| JP | 2008143627 | A | 6/2008 |

OTHER PUBLICATIONS

Office Action of Corresponding German Patent Application 11 2021 006 745.1 (with Machine Translation), mailed Nov. 1, 18, 2025, 9 pages, German Patent and Trademark Office.

* cited by examiner

CRANE AND CONTROL METHOD FOR SLEWING AND TRAVELING OF A CRANE UNDER NO LOAD WHILE HAVING A SUPER-LIFT COUNTERWEIGHT

CROSS-REFERENCE TO RELATED APPLICATIONS

This application is based on and claims priority to Chinese application No. 202110465902.2, filed on Apr. 28, 2021, the application of which is hereby incorporated by reference in its entirety.

FIELD OF THE INVENTION

The present application relates to the field of lifting equipment, in particular to a crane and a control method thereof.

BACKGROUND OF THE INVENTION

Some cranes are equipped with a super-lift jib to improve the force on a boom. Moreover, in the case where a super-lift jib is provided, usually a super-lift counterweight and a pushing device are provided for the super-lift jib. In the process of hoisting a weight by such a crane, the super-lift counterweight is off the ground, and its distance from a slewing center of a turntable is changed under the action of the pushing device, so as to obtain different stabilizing moments to increase the stability of the whole vehicle and prevent tipping over.

Under no load (i.e., when the crane is not hoisting a weight), the crane cannot slew or travel if the super-lift counterweight is not off the ground. Therefore, in order to enable the crane to slew or travel under no load while carrying the super-lift counterweight, in the related art, a hovering device is provided under the super-lift jib, and two ends of the hovering device are respectively connected to the turntable and the super-lift jib, and carries the weight of the super-lift counterweight under no load, so that the super-lift counterweight is kept off the ground, to achieve slewing and traveling under no load while carrying the super-lift counterweight.

Although the hovering device in the above-mentioned related art can meet the requirement of slewing and traveling under no load while carrying the super-lift counterweight, it is huge and complicated in structure, and liable to interfere with the super-lift jib and the pushing device, etc., and also has problems of great difficulty in assembly and low assembly efficiency.

SUMMARY OF THE INVENTION

The present application aims to provide a crane and a control method thereof, so as to more conveniently achieve the function of slewing and traveling of a crane under no load while having a super-lift counterweight.

To achieve the above object, the present application provides a crane, including: a body, including a chassis and a turntable, the turntable being rotatably arranged on the chassis;

a super-lift device, including a super-lift jib, a suspension pulling member and a balancing mechanism, the balancing mechanism including a super-lift counterweight and a pushing device, first ends of the super-lift jib and the pushing device are both connected to the turntable, the suspension pulling member is connected to a second end of the super-lift jib and the super-lift counterweight, a second end of the pushing device is connected to the super-lift counterweight to adjust a distance between the super-lift counterweight and a slewing center of the turntable; and a hovering device configured to support the super-lift counterweight above a ground when the crane is under no load, wherein a first end of the hovering device is connected to the turntable and a second end of the hovering device is not connected to the super-lift jib.

In some embodiments, the second end of the hovering device is connected to the balancing mechanism.

In some embodiments, the second end of the hovering device is detachably connected to the balancing mechanism.

In some embodiments, the second end of the hovering device is provided with a hook, and the hovering device is detachably connected to the balancing mechanism through the hook.

In some embodiments, the balancing mechanism includes a lifting cylinder and a positioning shaft, the lifting cylinder being connected to the super-lift counterweight and driving the super-lift counterweight to ascend/descend, the positioning shaft being arranged on the lifting cylinder and implementing the connection between the balancing mechanism and the hovering device by snapping into the hook.

In some embodiments, an opening of the hook faces upward.

In some embodiments, the hovering device includes a support beam, a tray, a connecting rod or a hovering cylinder.

In some embodiments, the first end of the hovering device is hinged to the turntable, or the first end of the hovering device is welded to the turntable.

In some embodiments, the crane includes a first detection device configured to detect forces on the suspension pulling member and the hovering device to determine a weight of the super-lift counterweight; and/or the crane includes a mast, a super-lift pulling member and a second detection device, wherein a first end of the mast being is connected to the turntable, a second end of the mast is connected to the super-lift jib by the super-lift pulling member, and the second detection device is configured to detect a force on the super-lift pulling member.

In some embodiments, the first detection device includes a tension sensor, a pressure sensor or an oil pressure sensor; and/or the second detection device includes a tension sensor.

Based on the crane of embodiments of the present application, the present application also provides a control method, including:

controlling the pushing device to reduce the distance between the super-lift counterweight and the slewing center of the turntable to a preset value; and controlling the balancing mechanism to engage with the hovering device to support the super-lift counterweight above the ground with the hovering device, so that the crane is capable of slewing or traveling under no load while carrying the super-lift counterweight.

In some embodiments, controlling the balancing mechanism to engage with the hovering device includes:

controlling the super-lift counterweight to fall onto the hovering device; or connecting the second end of the hovering device to the balancing mechanism.

In some embodiments, controlling the balancing mechanism to engage with the hovering device includes:

controlling the super-lift counterweight to fall onto a tray of the hovering device; or controlling a positioning shaft of the balancing mechanism arranged on a lifting cylinder to fall into a hook of the hovering device; or connecting a second end of a connecting rod or a hovering cylinder of the hovering device to the pushing device.

In some embodiments, controlling a positioning shaft of the balancing mechanism arranged on a lifting cylinder to fall into a hook of the hovering device includes:

controlling the lifting cylinder to drive the super-lift counterweight to descend, so that the positioning shaft falls into the hook and snaps into the hook.

In some embodiments, in the process of controlling the balancing mechanism to engage with the hovering device, controlling the super-lift counterweight and a weight hoisted by the crane to fall alternately, taking one which is met first of two conditions that a force F1 on the super-lift pulling member of the crane reaches a maximum limit value Fmax and a load rate of the crane reaches a maximum value as an ending condition of each falling process of the super-lift counterweight, and taking one which is met first of two conditions that the force F1 on the super-lift pulling member drops to a minimum limit value Fmin and a stability to resist back tipping moments of the whole machine reaches a specified limit as an ending condition of each falling process of the hoisted weight, until the balancing mechanism is engaged with the hovering device and the hoisted weight completes falling, wherein the load rate of the crane is a ratio of an actual load of the crane to a rated load of the crane.

In some embodiments, in the process of controlling the pushing device to reduce the distance between the super-lift counterweight and the stewing center of the turntable to the preset value, an operation of reducing the amplitude of the super-lift counterweight and an operation of lowering a weight are controlled to be carried out alternately, taking one which is met first of two conditions that a force F1 on the super-lift pulling member drops to a minimum limit value Fmin and a stability to resist back tipping moments of the whole machine reaches a specified limit as an ending condition of each operation of lowering the weight, and taking one which is met first of two conditions that the force F1 on the super-lift pulling member increases to a maximum limit value Fmax and a load rate increases to a maximum value as an ending condition of each operation of reducing the amplitude of the super-lift counterweight, until the distance between the super-lift counterweight and the slewing center of the turntable is reduced to the preset value, wherein reducing the amplitude of the super-lift counterweight is reducing the distance between the super-lift counterweight and the slewing center of the turntable.

In some embodiments, the control method includes:

before controlling the pushing device to reduce the distance between the super-lift counterweight and the slewing center of the turntable to the preset value, lifting the super-lift counterweight off the ground;

wherein in the process of lifting the super-lift counterweight off the ground, controlling the super-lift counterweight and the hoisted weight to ascend alternately, taking one which is met first of two conditions that a force F1 on the super-lift pulling member reaches a maximum limit value Fmax and a load rate reaches a maximum value as an ending condition of each operation of lifting the hoisted weight, and taking one which is met first of two conditions that the force F1 on the super-lift pulling member drops to a minimum limit value Fmin and a stability to resist back tipping moments of the whole machine reaches a specified limit as an ending condition of each operation of lifting the super-lift counterweight, until the super-lift counterweight leaves the ground.

In some embodiments, the control method includes:

before controlling the pushing device to reduce the distance between the super-lift counterweight and the slewing center of the turntable to the preset value, and after lifting the super-lift counterweight off the ground, lifting the hoisted weight off the ground;

wherein in the process of lifting the hoisted weight off the ground, an operation of increasing an amplitude of the super-lift counterweight and an operation of lifting the weight are controlled to be carried out alternately, taking one which is met first of the two conditions that the force F1 on the super-lift pulling member drops to the minimum limit value Fmin and the stability to resist back tipping moments of the whole machine reaches the specified limit as an ending condition of each operation of increasing the amplitude of the super-lift counterweight, and taking one which is met first of the two conditions that the force F1 on the super-lift pulling member increases to the maximum limit value Fmax and the load rate increases to the maximum value as an ending condition of each operation of lifting the weight, until the hoisted weight leaves the ground, wherein increasing the amplitude of the super-lift counterweight is increasing the distance between the Fmin super-lift counterweight and the slewing center of the Fmin turntable.

By providing the hovering device, only the first end of which is connected to the turntable, and the second end of which is separated from the super-lift jib, not only the suspension and stay of the super-lift counterweight is implemented under no load, but also the structure is simpler and the assembly efficiency is higher, therefore, the function of slewing and traveling of the crane under no load while carrying the super-lift counterweight is achieved more conveniently.

Other features and advantages of the present application will become apparent from the following detailed description of exemplary embodiments of the present application with reference to the accompanying drawings.

BRIEF DESCRIPTION OF THE DRAWINGS

To more clearly describe technical solutions in the embodiments of the present application or in the prior art, a brief introduction to the drawings for use in description of the embodiments or the prior art will be given below. Apparently, the drawings described below are only some embodiments of the present application, and to those of ordinary skill in the art, other drawings may also be obtained based on these drawings without creative effort.

DETAILED DESCRIPTION OF THE EMBODIMENTS

Technical solutions in the embodiments of the present application will be described below clearly and completely in conjunction with the accompanying drawings in the embodiments of the present application. Obviously, the described embodiments are only part of, instead of all of the embodiments of the present application. The following description of at least one exemplary embodiment is actually only illustrative, and in no way serves as any limitation on the present application and its application or use. Based on the embodiments in the present application, all other embodiments obtained by those of ordinary skill in the art without creative work should fall into the protection scope of the present application.

Technologies, methods, and equipment known to those of ordinary skill in the related art may be not discussed in detail, but where appropriate, the technologies, methods, and equipment should be regarded as part of the specification.

In the description of the present application, it should be understood that the use of terms such as "first" and "second" to define parts and components is only for the convenience of distinguishing the corresponding parts and components. Unless otherwise stated, the above terms have no special meanings, and therefore cannot be construed as limitations on the protection scope of the present application.

In description of the present application, it needs to be understood that orientation or position relationships indicated by orientation words such as "front", "rear", "up", "down", "left", "right", "lateral", "vertical", "perpendicular", "horizontal", "top" and "bottom" are usually determined based on an orientation or position relationship of a crane when it is traveling normally, wherein a heading direction of the crane is "front", a backing direction of the crane is "rear", and up, down, left and right directions when it faces "forward" are up, down, left and right.

In addition, technical features involved in different implementations of the present application described below may be combined with each other so long as they do not conflict with each other.

Figure 1:
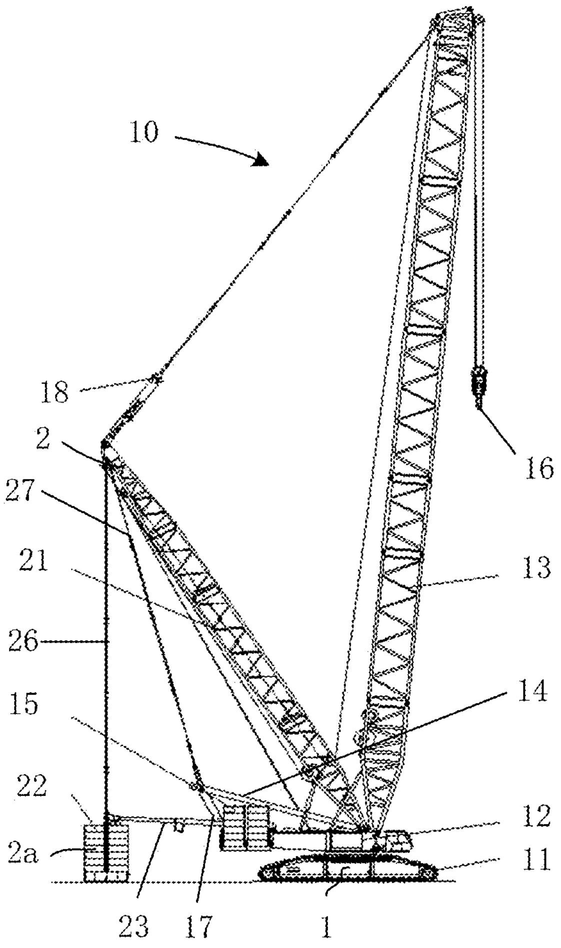
FIG. 1 is an overall structure diagram of a crane provided with no hovering device in the related art.

FIG. 1 shows the structure of some cranes in the related art. As shown in FIG. 1, the crane 10 includes a body 1 and a super-lift device 2.

The body 1 includes a chassis 11, a turntable 12, a boom 13, a cliver 16, a mast 14, a mast luffing device 17 and a turntable counterweight 15. The chassis 11 is configured to support and mount an engine and other components of the crane 10, and to implement a traveling function of a whole vehicle. In the case where the crane 10 is a crawler crane, the chassis 11 is a crawler chassis. The turntable 12 is rotatably arranged on the chassis 11 to drive components mounted thereon to rotate. The turntable counterweight 15 is arranged on the turntable 12 to plays a role of balancing a hoisted weight, thereby preventing the crane 10 from tipping over. A first end of the boom 13 (also known as a jib or main boom) is connected to the turntable 12, so that the boom 13 is capable of slewing under the drive of the turntable 12. A second end of the boom 13 is provided with the cliver 16 for hoisting a weight, so as to achieve a hoisting function of the crane 10. A first end of the mast 14 is connected to the turntable 12 to rotate under the drive of the turntable 12. A second end of the mast 14 is connected to the turntable 12 through the mast luffing device 17 (e.g., a pulley block), so that the mast 14 can luff under the action of the mast luffing device 17.

The super-lift device 2 is arranged on the body 1, for improving forces on components and the stability of the whole machine to improve the lifting performance. As shown in FIG. 1, the super-lift device 2 includes a super-lift jib 21, a balancing mechanism **2*a*, a suspension pulling member 26 and a super-lift pulling member 27. The balancing mechanism 2*a* includes a super-lift counterweight 22 and a pushing device 23. A first end of the super-lift jib 21 is connected to the turntable 12 to slew under the drive of the turntable 12. A second end of the super-lift jib 21 is connected to the second end of the boom 13 through a super-lift luffing device 18 (e.g., a pulley block) on the one hand, to the second end of the mast 14 through the super-lift pulling member 27 on another hand, and to the super-lift counterweight 22 through the suspension pulling member 26 on yet another hand. The pushing device 23 has a first end connected to the turntable 12, and a second end connected to the super-lift counterweight 22, and changes amplitudes of the super-lift counterweight 22 (i.e., implements luffing of the super-lift counterweight 22) by adjusting a distance between the super-lift counterweight 22 and a slewing center of the turntable 12 (also called a moment radius or moment arm of the super-lift counterweight 22**), thereby obtaining different stabilizing moments.

Figure 4:
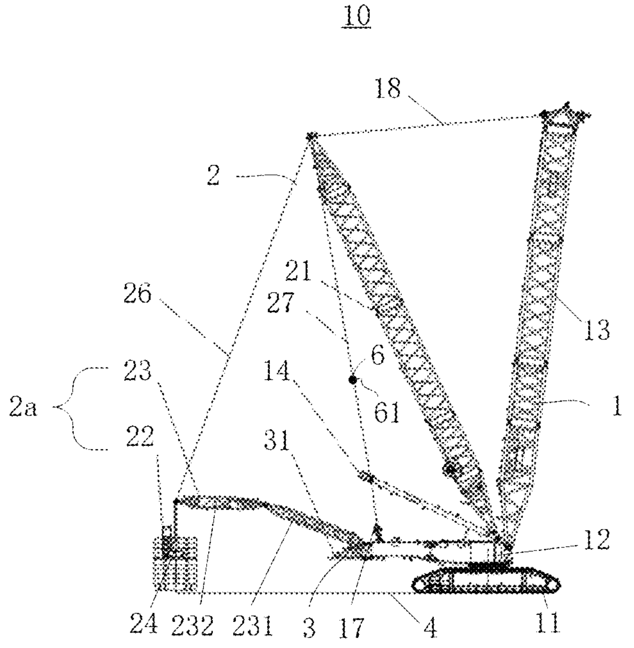
FIG. 4 is a structure diagram of a crane in embodiments of the present application.

In conjunction with FIG. 4, as a structural form of the pushing device 23, the pushing device 23 includes a first pushing arm 231 and a second pushing arm 232. The second pushing arm 232 is connected to the turntable 12 through the first pushing arm 231, and the second pushing arm 232 is connected to the super-lift counterweight 22. The second pushing arm 232 is hinged to the first pushing arm 231, and generally a pushing drive mechanism is connected between the second pushing arm 232 and the first pushing arm 231, and the pushing drive mechanism changes an angle of the second pushing arm 232 to implement adjustment of moment radius of the super-lift counterweight 22. The pushing drive mechanism may include a pushing cylinder (not shown in the figure), and the pushing cylinder extends and retracts to change the angle of the second pushing arm 232, thereby implementing adjustment of the amplitude of the super-lift counterweight 22.

The super-lift jib 21, which is generally of a truss-type structure, is configured to increase an included angle between a pulling member, such as a pulling plate or pulling cable, and the boom 13, so as to improve a force on the boom 13, and increase a carrying capacity of the boom 13, thereby improving the lifting performance of the crane 10.

The super-lift counterweight 22, together with the aforementioned turntable counterweight 15 and a vehicle body counterweight not shown, forms a counterweight system of the whole vehicle, which mainly uses weight ballasts to balance a hoist weight (i.e., the weight of a hoisted weight) to achieve moment balance of the whole machine and keep the whole machine stable.

The counterweight system is generally matched with a load hoisted by the diver 16. A product of the hoist weight and the amplitude of the boom 13 under a working condition is a hoist moment under the corresponding working condition. In order to achieve the balance of the crane 10, it is necessary to add a counterweight system at a rear of the turntable 12, so as to balance the corresponding hoist moment. In a large-tonnage crane, the hoist moment is too large, and the hoist moment cannot be balanced only by the vehicle body counterweight and the turntable counterweight 15 counterbalance. Therefore, the super-lift counterweight 22 is further added, and the moment radius of the super-lift counterweight 22 is adjusted by the pushing device 23, so that different stabilizing moments is provided to achieve the balance of the whole vehicle.

When the crane 10 performs a hoisting task, the super-lift counterweight 22 is lifted off the ground, and in this case, the crane 10 can travel and slew normally. However, in the crane 10 shown in FIG. 1, when the crane 10 is not hoisting a load (i.e., under no load), the weight of the super-lift counterweight 22 can only be pressed on the ground, and in this case, the crane 10 cannot travel or slew. Therefore, in this case, the crane 10 cannot travel or slew in a no-load state while carrying the super-lift counterweight 22, and in order to achieve traveling or slewing of the crane 10 under no load, usually the super-lift counterweight 22 has to be completely removed, but this obviously limits a convenience of use of the crane 10 and affects a working efficiency of the crane 10.

In view of the above situation, the crane 10 shown in FIG. 1 is improved in some related arts by adding a hovering device 3 to the crane 10. The hovering device 3 is configured to support the entire weight of the super-lift counterweight 22 under no load, so as to achieve the function of traveling and slewing of the crane 10 under no load while carrying the super-lift counterweight 22.

Figure 2:
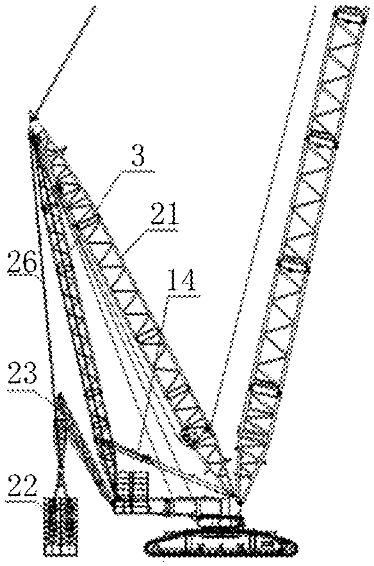
FIG. 2 is a partial structure diagram of a crane provided with a hovering device in the related art.

FIG. 2 shows the structure of a crane 10 with a hovering device 3 in the related art. For the sake of clarity, only part of the structure of the crane 10 is shown in FIG. 2.

As shown in FIG. 2, in the crane 10, the hovering device 3 is a connecting frame connected to the mast 14 and the rear of the turntable 12, and two ends of the hovering device 3 are respectively connected to the turntable 12 and the super-lift jib 21. In this way, the hovering device 3 can bear a pressure, and can support the entire weight of the super-lift counterweight 22 under no load, and release a force applied by the super-lift counterweight 22 to the super-lift jib 21.

Based on the above structure, on the one hand, when a weight is hoisted, the distance between the super-lift counterweight 22 and the slewing center of the turntable 12 can be increased by the pushing device 23 to obtain a larger stabilizing moment to counterbalance the hoist moment, and on the other hand, under no load, the distance between the super-lift counterweight 22 and the slewing center of the turntable 12 can be reduced to a preset value by the pushing device 23 to prevent the crane 10 from tipping over backwards, and the super-lift counterweight 22 is supported above the ground 4 by the hovering device 3 to keep the super-lift counterweight 22 off the ground, so that the crane 10 can travel and slew under no load while carrying the super-lift counterweight 22.

As can be seen, based on the provided hovering device 3, the function of traveling and slewing under no load while carrying the super-lift counterweight 22 can be achieved. Since the super-lift counterweight 22 does not need to be removed, it is more convenient to use and has less impact on work efficiency.

Figure 3:
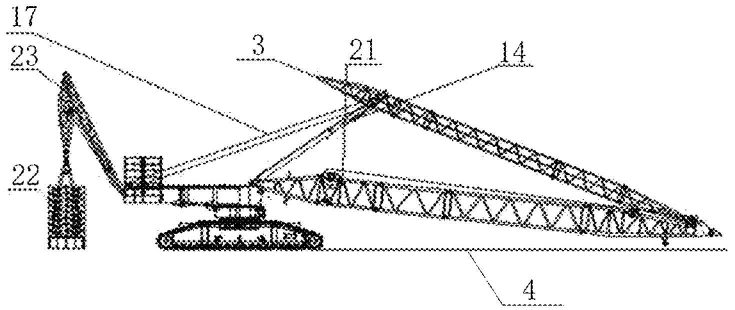
FIG. 3 shows an installation process diagram of the hovering device of the crane shown in FIG. 2.

However, the above-mentioned hovering device 3 has a huge structure, a heavy weight and a high cost, and also, the super-lift pulling member 27 (such as a pulling plate) between the mast 14 and the super-lift jib 21 is placed in the hovering device 3, so the structure is relatively complicated. Moreover, the above-mentioned hovering device 3 makes a top of the super-lift jib 21 be a statically indeterminate structure, such that force transmission is complicated. At the same time, the above-mentioned hovering device 3 is liable to interfere with the super-lift jib 21, the mast 14 and the pushing device 23 during movement, which affects working smoothness and leads to great difficulty in design. In addition, referring to FIG. 3, during assembly, the above-mentioned hovering device 3 needs to be mounted to the super-lift jib 21 first, and then the super-lift jib 21 is lifted to a working position, so the assembly efficiency is low.

It can be seen that, in the case of using the above-mentioned hovering device 3, there are problems such as complex structure, high cost, low assembly efficiency, easy interference, and difficult design.

In view of the above situation, the present application improves the structure of the crane 10, so as to more conveniently achieve the function of slewing and traveling under no load while carrying the super-lift counterweight.

FIGS. 4 to 12 exemplarily show the structure of a crane 10 in the present application.

Referring to FIGS. 4 to 12, in embodiments of the present application, the crane 10 still includes a hovering device 3, and a first end of the hovering device 3 is still connected to a turntable 12, but a second end of the hovering device 3 is no longer connected to a super-lift jib 21.

The above-mentioned hovering device 3 can still support the super-lift counterweight 22 above the ground 4 and carry the entire weight of the super-lift counterweight 22 under no load, so that the super-lift counterweight 22 is kept off the ground to achieve suspension and stay of the super-lift counterweight 22 at the rear of the turntable 12. In this way, all the weight of the super-lift counterweight 22 is carried by the hovering device 3, the suspension pulling member 26 is in a relaxed state, a pulling force on the super-lift jib 21 applied by the super-lift counterweight 22 is released, and in the no-load state, the whole vehicle reaches a balanced state again, so that the crane 10 can travel and slew while carrying the super-lift counterweight 22 without removing the super-lift counterweight 22. Hence, the provided hovering device 3 can still achieve the function of traveling and slewing under no load while carrying the super-lift counterweight, which improves the convenience of use of the crane 10.

Moreover, the second end of the hovering device 3 is not connected to the super-lift jib 21, but is always separated from the second end of the super-lift jib 21. Therefore, the structure is simpler, and the hovering device 3 can be designed smaller and does not need to be too huge, which is conducive to weight reduction and cost saving. At the same time, the hovering device 3 does not cause the top of the super-lift jib 21 to become a statically indeterminate structure, so force transmission is simplified. Moreover, the hovering device 3 is not liable to interfere with the super-lift jib 21, the mast 14 and the pushing device 23 during movement, which is conducive to improving working smoothness and reducing design difficulty. In addition, during installation, the hovering device 3 only needs to be connected to the turntable 12. For example, the first end of the hovering device 3 may be hinged to the turntable 12 by several pin shafts, or the first end of the hovering device 3 may be welded to the turntable 12. Then there is no need to implement a jib lifting operation of the super-lift jib during the whole assembly process of the hovering device 3, so the assembly efficiency is higher.

As can be seen, based on the above configuration, the function of slewing and traveling under no load while carrying the super-lift counterweight is achieved based on a simpler structure and a lower cost in the present application, and the assembly efficiency is higher, therefore, the function of slewing and traveling of the crane 10 under no load while carrying the super-lift counterweight is achieved more conveniently.

As an implementation that the hovering device 3 achieves a hovering function of the super-lift counterweight, in some embodiments, the second end of the hovering device 3 is separably engaged with the balancing mechanism 2*a*, wherein when the second end of the hovering device 3 is engaged with the balancing mechanism 2*a*, the weight of the super-lift counterweight 22 is entirely carried by the hovering device 3 and is not carried by the super-lift jib 21, so the force applied to the super-lift jib by the super-lift counterweight 22 disappears, and the balance of the whole vehicle in the no-load state is achieved; and when the second end of the hovering device 3 is separated from the balancing mechanism 2*a*, the hovering device 3 does not support the super-lift counterweight 22, and at this time, the super-lift counterweight 22, which is separated from the hovering device 3, can change its distance from the slewing center of the turntable 12 under the action of the pushing device 23, thereby conveniently providing different stabilizing moments.

The separable engagement between the second end of the hovering device 3 and the balancing mechanism 2*a* may be achieved in such a manner that they only contact each other but have no connection relationship, or that they are connected detachably.

Figure 12:
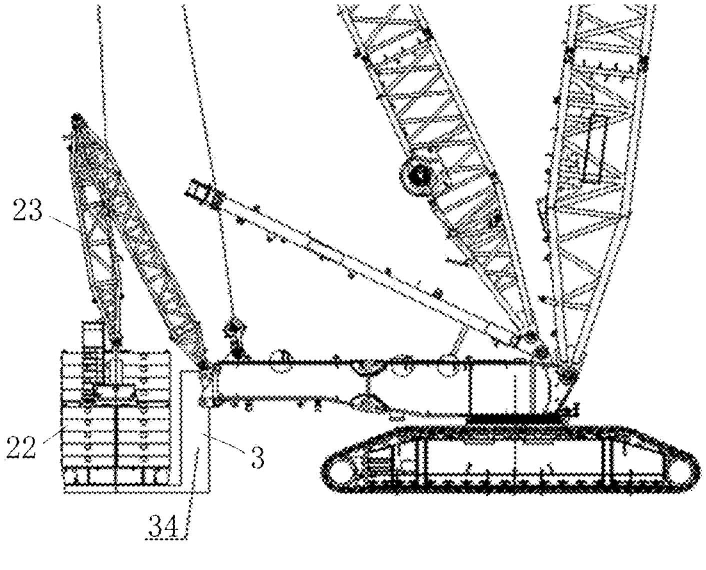
FIG. 12 is a second variation of the present application.

For example, referring to FIG. 12, in some embodiments, the hovering device 3 includes a tray 34. A first end of the tray 34 is connected to the turntable 12, and a second end of the tray 34 is a free end. In this case, the engagement between the second end of the hovering device 3 and the balancing mechanism 2*a* is an engagement in which they only contact with each other but have no connection relationship. Under no load, the super-lift counterweight 22 can fall onto the tray 34 and be supported by the tray 34, so that the weight of the super-lift counterweight 22 is entirely pressed on the tray 34 and carried by the tray 34. When a load is hoisted, the super-lift counterweight 22 can conveniently leave the tray 34 to provide a stabilizing moment required for the whole vehicle.

For another example, referring to FIGS. 4 to 10, in some embodiments, the second end of the hovering device 3 is provided with a hook 32, and the hovering device 3 is detachably connected to the balancing mechanism 2*a* by the hook 32. In this case, the engagement between the second end of the hovering device 3 and the balancing mechanism 2*a* is an engagement based on a detachable connection relationship. Under no load, the balancing mechanism 2*a* can be hooked to the hook 32, so that the entire weight of the super-lift counterweight 22 is carried by the hovering device 3. When a load is hoisted, the balancing mechanism 2*a* can be separated from the hovering device 3 conveniently by releasing the hooking relationship between the balancing mechanism 2*a* and the hook 32, so that the super-lift counterweight 22 can conveniently leave the hovering device 3 to provide a stabilizing moment required for the whole vehicle.

Referring to FIGS. 7 to 10, an opening of the hook 32 may face upward. In this way, the balancing mechanism 2*a* is separated from and hooked to the hook 32 simply by ascending and descending the balancing mechanism 2*a*, which is simple and convenient.

As shown in FIGS. 7 to 10, in some embodiments, the balancing mechanism 2*a* includes a lifting cylinder 24 and a positioning shaft 25. The lifting cylinder 24 is connected to the super-lift counterweight 22 to drive the super-lift counterweight 22 to ascend and descend. The positioning shaft 25 is arranged on the lifting cylinder 24, and ascends and descends with the super-lift counterweight 22 when the lifting cylinder 24 drives the super-lift counterweight 22 to ascend and descend. Thus, in the case where the detachable connection between the hovering device 3 and the balancing mechanism 2*a* is implemented based on the hook 32, the connection between the balancing mechanism 2*a* and the hovering device 3 can be achieved by clamping the positioning shaft 25 into the hook 32. Moreover, in the case where the opening of the hook 32 faces upward, the positioning shaft 25 can be conveniently hooked to the hook 32 or separated from the hook 32 in a descending or ascending process of the super-lift counterweight 22 which is at a distance of a preset value from the slewing center, and no other operations are required, therefore, the engagement and separation of the balancing mechanism 2*a* and the hovering device 3 is achieved more efficiently.

Figure 10:
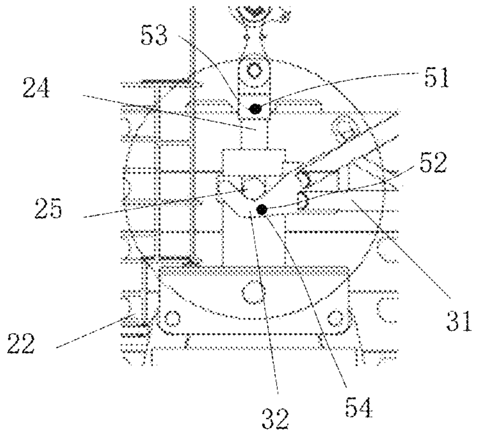
FIG. 10 is a partial enlarged view at II in FIG. 9.

In addition, referring to FIG. 10, in some embodiments, an inner surface of the hook 32 (i.e., a surface for hooking the balancing mechanism 2*a*) is an inclined surface, and in this case, the corresponding inclined surface provides a slideway for a portion (e.g., the positioning shaft 25) of the balancing mechanism 2*a* configured to be hooked to the hook 32. In this way, a certain inclusiveness is provided for a precision of a position where the portion (e.g. the positioning shaft 25) of the balancing mechanism 2*a* configured to be hooked to the hook 32 enters a hooking point, so that even if the magnitude (i.e., the distance from the slewing center) of the super-lift counterweight 22 deviates from the preset value, the portion (e.g., the positioning shaft 25) of the balancing mechanism 2*a* configured to be hooked to the hook 32 can still enter the hook 32 smoothly to achieve hovering of the super-lift counterweight 22 on the hovering device 3. A specific size of inclination may be designed according to the deviation magnitude of the amplitude of the super-lift counterweight 22.

It should be understood that the portion of the balancing mechanism 2*a* configured to be engaged with the hovering device 3 is not limited to the aforementioned positioning shaft 25. For example, in the case where the hovering device 3 includes a tray 34 as shown in FIG. 12, the portion of the balancing mechanism 2*a* configured to be engaged with the hovering device 3 is the super-lift counterweight 22. Alternatively, the portion of the balancing mechanism 2*a* configured to be engaged with the hovering device 3 may be the pushing device 23. For example, referring to FIG. 11, in some embodiments, the hovering device 3 includes a connecting rod 33 or a hovering cylinder (not shown in the figure), a first end of the connecting rod 33 or the hovering cylinder is connected to the turntable 12, and a second end of the connecting rod 33 or the hovering cylinder is connected to the pushing device 23 (specifically may be the first pushing arm 231), and in this case, the portion of the balancing mechanism 2*a* configured to be engaged with the hovering device 3 is the pushing device 23.

Furthermore, as can be seen from the above description, the engagement between the balancing mechanism 2*a* and the hovering device 3 may be achieved either by controlling the super-lift counterweight 22 to fall onto the hovering device 3 (for example, in the case where the hovering device 3 includes the tray 34) or by connecting the second end of the hovering device 3 to the balancing mechanism 2*a* (for example, in the case where the hovering device 3 includes the hook 32 or the connecting rod 33).

Embodiments shown in FIGS. 4 to 12 are further described below.

A first embodiment shown in FIGS. 4 to 10 is described first.

As shown in FIGS. 4 to 10, in the first embodiment, the crane 10 is a crawler crane and includes a body 1, a super-lift device 2, and a hovering device 3.

As shown in FIG. 4, the body 1 includes a chassis 11, a turntable 12, a boom 13, a mast 14, and a mast luffing device 17. The turntable 12 is rotatably arranged on the chassis 11. A turntable counterweight 15 (omitted and not shown in the FIGS. 4-10) is arranged on the turntable 12. First ends of the boom 13 and the mast 14 are both connected to a front part of the turntable 12. A second end of the boom 13 is provided with a diver 16 (omitted and not drawn in the FIGS. 4-10). A second end of the mast 14 is connected to the turntable 12 through the mast luffing device 17 (e.g., a pulley block).

Figure 8:
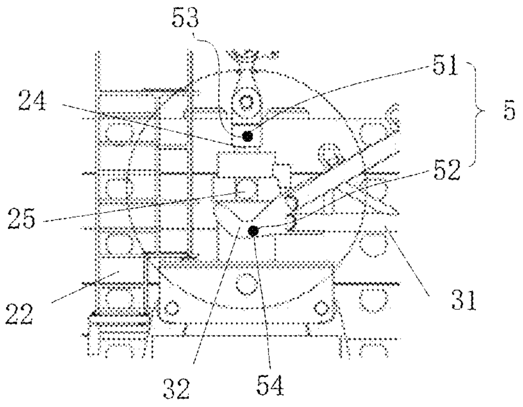
FIG. 8 is a partial enlarged view at I in FIG. 7.
Figure 9:
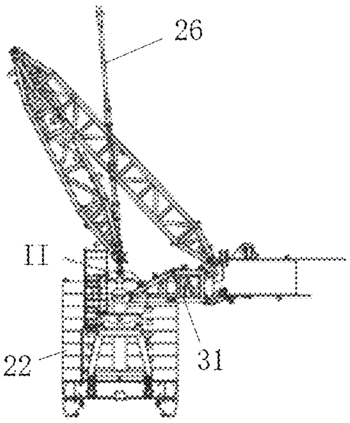
FIG. 9 shows a state diagram of a crane when a positioning shaft is snapped in a hook.

In conjunction with FIGS. 4, 8 and 10, it can be seen that the super-lift device 2 includes a super-lift jib 21, a balancing mechanism **2*a*, a suspension pulling member 26 and a super-lift pulling member 27. The balancing mechanism 2*a* includes a super-lift counterweight 22, a pushing device 23 and a lifting cylinder 24. The pushing device 23 includes a first pushing arm 231, a second pushing arm 232, and a pushing cylinder (not shown in the FIGS. 4-10). As shown in FIG. 4, a first end of the super-lift jib 21 is connected to the front part of the turntable 12. A second end of the super-lift jib 21 is connected to the second end of the boom 13 through a super-lift luffing device 18 (e.g., a pulley block) on the one hand, to the second end of the mast 14 through the super-lift pulling member 27 on another hand, and to the super-lift counterweight 22 through the suspension pulling member 26 on yet another hand. The first pushing arm 231 is hinged to a rear part of the turntable 12 and is connected to the super-lift counterweight 22 through the second pushing arm 232 which is hinged with the first pushing arm 231. A cylinder barrel and a cylinder rod of the pushing cylinder are respectively connected to the first pushing arm 231 and the second pushing arm 232, so that when the pushing cylinder extends and contracts, the distance from the super-lift counterweight 22 to the slewing center of the turntable 12 is changed, thereby changing amplitudes of the super-lift counterweight 22. As shown in FIG. 4 and FIGS. 8 to 10, the cylinder barrel of the lifting cylinder 24 is connected to the super-lift counterweight 22, and the cylinder rod of the lifting cylinder 24 is connected to the second pushing arm 232, so that the pushing device 23 is connected to the super-lift counterweight 22 through the lifting cylinder 24, and the lifting cylinder 24 can drive the super-lift counterweight 22 to move up and down by extending and contracting, thereby implementing adjustment of the ground clearance of the super-lift counterweight 22. The cylinder barrel of the lifting cylinder 24 is provided with a positioning shaft 25. When the lifting cylinder 24 extends and drives the super-lift counterweight 22 to descend, the cylinder barrel of the lifting cylinder 24 descends and the positioning shaft 25** descends therewith.

Figure 6:
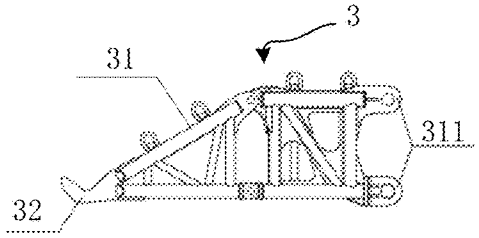
FIG. 6 is a structure diagram of the hovering device in FIG. 4.
Figure 7:
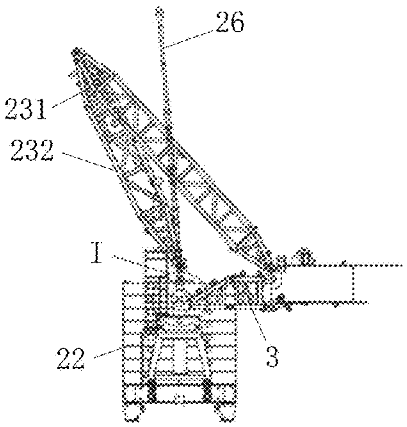
FIG. 7 shows a state diagram of a crane when a positioning shaft is not yet snapped in a hook.

As shown in FIGS. 4 and 6, the hovering device 3 is arranged below the pushing device 23 and includes a support beam 31 and a hook 32. A first end of the support beam 31 is connected to the rear part of the turntable 12 through a hinge hole 311. A second end of the support beam 31 extends backward from the turntable 12 and forms a free end. The hook 32 is arranged at the second end of the support beam 31 to be connected to the aforementioned positioning shaft 25, so as to achieve detachable connection between the hovering device 3 and the super-lift structure **2*a* to implement no-load hovering of the super-lift counterweight 22. An opening of the hook 32 faces upward, and the opening of the hook 32** has an inclination.

Figure 5:
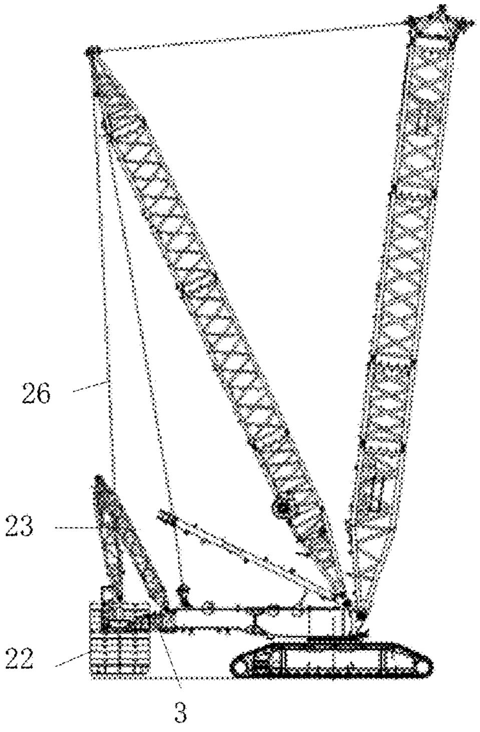
FIG. 5 is a state diagram of the crane shown in FIG. 4 when a super-lift counterweight is engaged with a hovering device.

FIGS. 4 and 5 respectively illustrate a state in which the super-lift counterweight 22 does not hover on the hovering device 3 and a state in which the super-lift counterweight 22 hovers on the hovering device 3. In the process of switching from FIG. 4 to FIG. 5, the amplitude of the super-lift counterweight 22 may be adjusted by the pushing device 23, and the super-lift counterweight 22 is moved to a position where its moment radius is equal to a preset value, so that the positioning shaft 25 is roughly located directly above the hook 32. Then, as shown in FIGS. 7 to 10, the lifting cylinder 24 is extended. Since the length of the suspension pulling member 26 is fixed, when the lifting cylinder 24 is extended, the cylinder barrel of the lifting cylinder 24 moves down together with the super-lift counterweight 22, until the positioning shaft 25 located on the cylinder barrel of the lifting cylinder 24 moves down from the position above the hook 32 (see FIG. 8) to a position where the positioning shaft 25 snaps into the hook 32 (see FIG. 10), at which point the hovering device 3 carries the entire weight of the super-lift counterweight 22, the suspension pulling member 26 is relaxed and unstressed, and a pulling force on the super-lift jib 21 applied by the super-lift counterweight 22 is released. Therefore, in a no-load state, the whole vehicle regains balance, and the crane 10 can move and slew while carrying the super-lift counterweight 22.

As can be seen, in this embodiment, the function of traveling and slewing under no load while carrying the super-lift counterweight is achieved simply by adding the hovering device 3 at the rear part of the turntable 12. There is no need to change the structures of components such as the super-lift jib 21, the mast 14, the suspension pulling member 26, the mast luffing device 17 and the pushing device 23, nor to connect the second end of the hovering device 3 to other components during assembly, therefore, the assembly and working efficiency is improved based on a simpler structure and a lower cost.

As shown in FIG. 6, in this embodiment, the support beam 31 is of a truss-type structure, but it should be understood that the support beam 31 may also be of other structural forms such as a box-type structure or an I-shaped structure.

Figure 11:
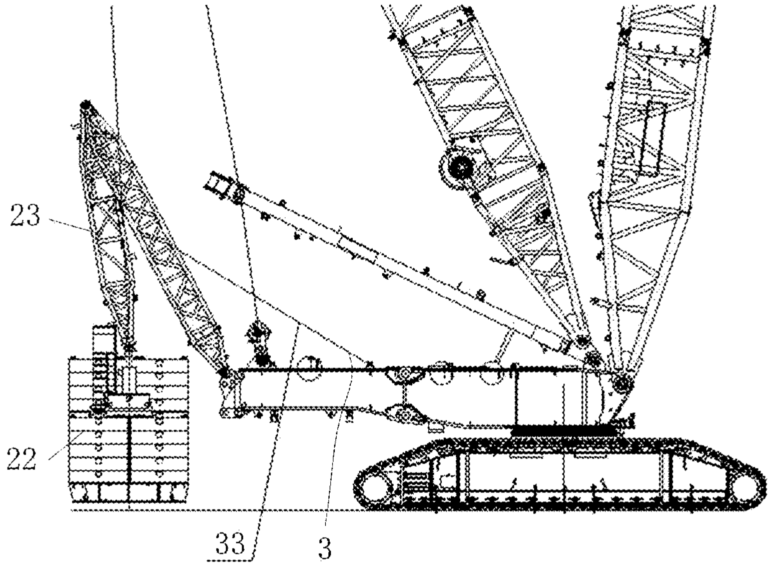
FIG. 11 is a first variation of the present application.

Next, a second embodiment shown in FIG. 11 is described.

As shown in FIG. 11, the second embodiment differs from the aforementioned first embodiment mainly in that the structure of the hovering device 3 is different. Specifically, in the second embodiment, the hovering device 3 does not include the aforementioned support beam 31 anymore, but includes a connecting rod 33. A first end of this connecting rod 33 is connected to the rear part of the turntable 12, and a second end of the connecting rod 33 is detachably connected to the first pushing arm 231. In this way, when hovering is not required, the second end of the connecting rod 33 can be kept in a separated state from the first pushing arm 231, so that the super-lift counterweight 22 can normally provide a stabilizing moment; and when hovering is required, it only needs to connect the second end of the connecting rod 33 to the first pushing arm 231, such that the entire weight of the super-lift counterweight 22 can be supported by the connecting rod 33 to achieve a no-load hovering function.

Alternatively, the connecting rod 33 may be replaced with a hovering cylinder. A second end of the hovering cylinder is always connected to the first pushing arm 231, and it just needs to control the hovering cylinder to be locked when hovering is required, such that the super-lift counterweight 22 is supported by the hovering cylinder to achieve the no-load hovering function.

Next, a third embodiment shown in FIG. 12 is described. As shown in FIG. 12, in the third embodiment, the hovering device 3 includes neither the support beam 31 and the hook 32 of the first embodiment, nor the connecting rod 33 or the hovering cylinder of the second embodiment, but includes a tray 34. The tray 34 is substantially L-shaped, with its vertical portion being connected to the rear part of the turntable 12 and extending downward from the turntable 12, and its horizontal portion extending horizontally backward from its vertical portion. When hovering is required, first the amplitude of the super-lift counterweight 22 is reduced to a preset value under the drive of the pushing device 23, and then the super-lift counterweight 22 descends under the drive of the lifting cylinder 24 until the super-lift counterweight 22 falls onto the horizontal portion of the tray 34, so that the weight of the super-lift counterweight 22 is entirely pressed on the tray 34 and is entirely carried by the tray 34 to achieve the no-load hovering function.

As can be seen from the above description, the crane 10 of embodiments of the present application can conveniently achieve the no-load hovering function of the super-lift counterweight 22.

In the foregoing embodiments, the crane 10 may further include a detection device, which detects a gravity center of the whole vehicle, so as to provide data support for stability calculation of the whole machine, facilitate controlling the execution of operations such as ascending/descending, luffing and hovering of a weight and the super-lift counterweight 22 to achieve a smoother operating process.

For example, in some embodiments, the crane 10 includes a first detection device 5. The first detection device 5 detects forces on the suspension pulling member 26 and the hovering device 3 to determine the weight of the super-lift counterweight 22. Determining the weight of the super-lift counterweight 22 based on a force detection result of the suspension pulling member 26 and the hovering device 3 can more accurately implement detection of the weight of the super-lift counterweight 22 than the case that the weight of the super-lift counterweight 22 is determined based only on a force detection result of the hovering device 3, because, the former can prevent affecting the accuracy of the detection result of the weight of the super-lift counterweight 22 in the case where the weight of the super-lift counterweight 22 is not entirely pressed on the hovering device 3 due to a hovering error. The first detection device 5 may include two detectors. The two detectors respectively correspond to the suspension pulling member 26 and the hovering device 3, and respectively detect the forces on the suspension pulling member 26 and the hovering device 3. The detector that detects the force on the suspension pulling member 26 may be called a first detector 51. The first detector 51 may include a tension sensor 61 or an oil pressure sensor 53. The tension sensor 61 is arranged on the suspension pulling member 26 and directly detects the tension on the suspension pulling member 26. The oil pressure sensor 53 is arranged on the lifting cylinder 24 and indirectly detects the force on the suspension pulling member 26 by detecting the oil pressure of the lifting cylinder 24. The second detector 52 may include a pressure sensor 54. The pressure sensor 54 is arranged on the hovering device 3 and directly detects the pressure on the hovering device 3.

For another example, in some embodiments, the crane 10 includes a second detection device 6. The second detection device 6 detects a force on the super-lift pulling member 27. The second detection device 6 may be arranged on the super-lift pulling member 27 and may specifically include a tension sensor 61.

Figure 13:
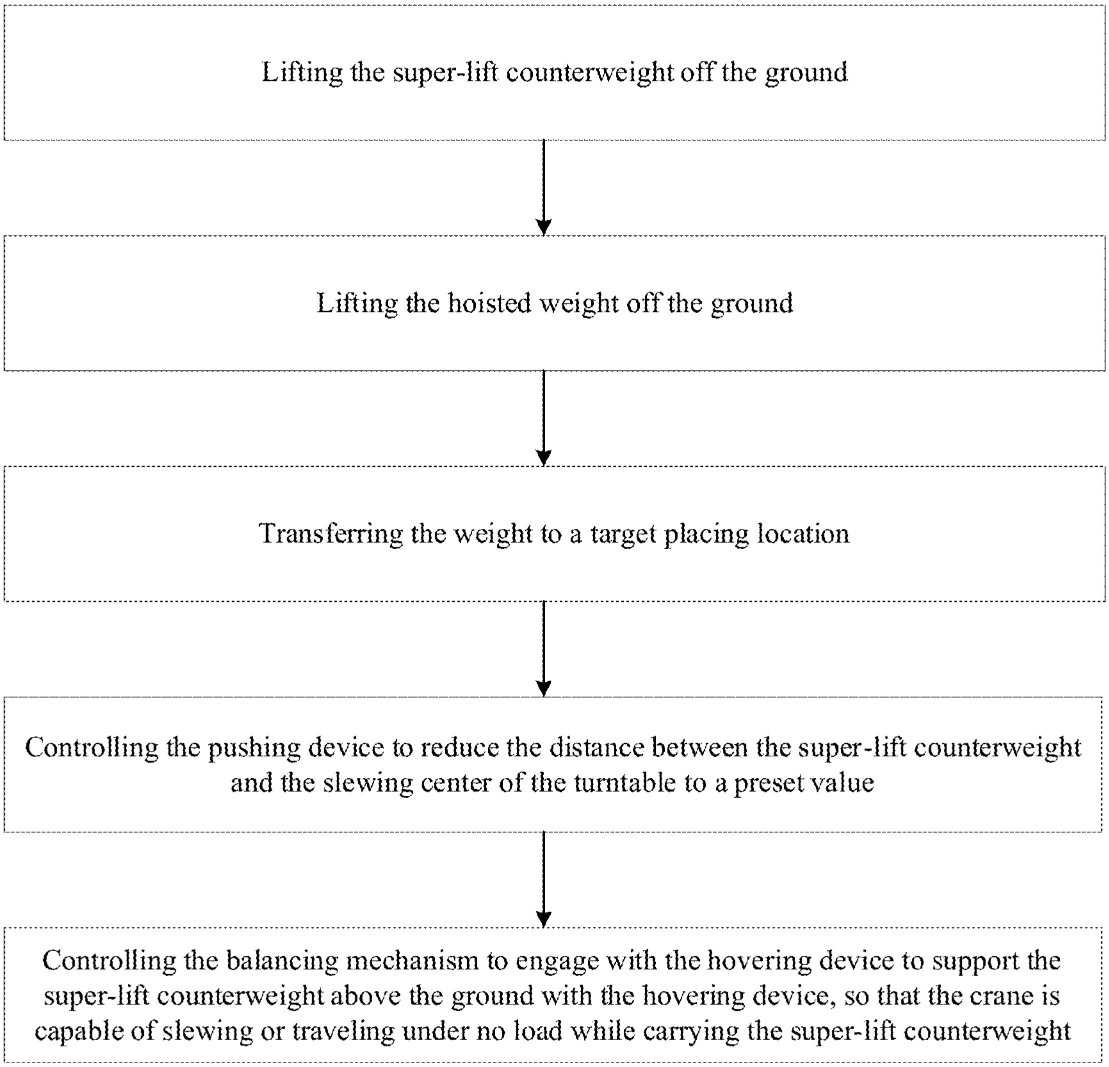
FIG. 13 shows a flow diagram of a control method in embodiments of the present application.

Based on the crane 10 of the above embodiments, referring to FIG. 13, the present application also provides a control method, including:

- controlling the pushing device 23 to reduce the distance between the super-lift counterweight 22 and the slewing center of the turntable 12 to a preset value; and
- controlling the balancing mechanism **2*a* to engage with the hovering device 3 to support the super-lift counterweight 22 above the ground 4 with the hovering device 3, so that the crane 10 is capable of slewing or traveling under no load while carrying the super-lift counterweight 22**.

The reduction to the preset value includes not only the case where the distance between the super-lift counterweight 22 and the slewing center of the turntable 12 is exactly equal to the preset value, but also the case where the distance between the super-lift counterweight 22 and the slewing center of the turntable 12 is not equal to the preset value, but deviates therefrom within an allowable range, thereby providing a fault tolerance rate for the amplitude changing process of the super-lift counterweight 22.

Controlling the balancing mechanism **2*a* to engage with the hovering device 3 may be controlling the super-lift counterweight 22 to fall onto the hovering device 3. For example, in the embodiment shown in FIG. 12, the engagement between the balancing mechanism 2*a* and the hovering device 3 may be achieved by controlling the super-lift counterweight 22 to fall onto the tray 34 of the hovering device 3. Alternatively, Controlling the balancing mechanism 2*a* to engage with the hovering device 3 may be connecting the second end of the hovering device 3 to the balancing mechanism 2*a*. For example, in the embodiment shown in FIG. 11, the engagement between the balancing mechanism 2*a* and the hovering device 3 may be achieved by connecting the second end of the connecting rod 33 of the hovering device 3 to the pushing device 23. For another example, in the embodiment shown in FIGS. 4 to 10, the engagement between the balancing mechanism 2*a* and the hovering device 3 may be achieved by controlling the positioning shaft 25 of the balancing mechanism 2*a* arranged on the lifting cylinder 24 to fall into the hook 32 of the hovering device 3. Specifically, when controlling the positioning shaft 25 to fall into the hook 32, the lifting cylinder 24 is controlled to drive the super-lift counterweight 22 to descend, so that the positioning shaft 25 falls into the hook 32 and snaps into the hook 32**.

In addition, in the process of controlling the balancing mechanism **2*a* to engage with the hovering device 3, controlling the super-lift counterweight 22 and a weight hoisted by the crane 10 to fall alternately, taking one which is met first of two conditions that a force F1 on a super-lift pulling member 27 of the crane 10 reaches a maximum limit value Fmax and a load rate of the crane 10 reaches a maximum value as an ending condition of each falling process of the super-lift counterweight 22, and taking one which is met first of two conditions that the force F1 on the super-lift pulling member 27 drops to a minimum limit value Fmin and a stability to resist back tipping moments of the whole machine reaches a specified limit as an ending condition of each falling process of the hoisted weight, until the balancing mechanism 2*a* is engaged with the hovering device 3, the hoisted weight completes falling. That is to say, in the corresponding process, the super-lift counterweight 22 is controlled to fall, and the super-lift counterweight 22 is controlled to stop the falling when the force F1 on the super-lift pulling member 27 increases to the maximum limit value Fmax or when the load rate increases to the maximum value; subsequently, the hoisted weight is controlled to fall, and the hoisted weight is controlled to stop the falling when the force F1 on the super-lift pulling member 27 drops to the minimum limit value Fmin or when the stability to resist back tipping moments of the whole machine reaches the specified limit (which is related to the weight of the super-lift counterweight 22, and may be determined based on the detection result of the first detection device); then, the super-lift counterweight 22 is controlled to fall again, and the process is so repeated, until the super-lift counterweight 22 falls solidly onto the hovering device 3, and the hoisted load is completely removed, at which time, the crane 10 is in a no-load state, and the super-lift counterweight 22 is in a hovering state, so the crane 10 can carry out no-load slewing and traveling while carrying the super-lift counterweight 22. The force F1 on the super-lift pulling member 27 may be determined by the second detection device. The load rate of the crane 10 is the ratio of an actual load of the crane 10 to a rated load of the crane 10. Here, the actual load and the rated load are respectively an actual load carried by the boom 13 and a rated load carried by the boom 13**, i.e., an actual load applied by the hoisted weight and a rated load applied by the hoisted weight.

The alternate operations of the super-lift counterweight 22 and the hoisted weight may occur in the process of engagement of the counterweight 2*a* and the hovering device 3 after the pushing device 23 reduces the moment radius of the super-lift counterweight 22 to the preset value as described above, and may also occur in the process that the pushing device 23 reduces the moment radius of the super-lift counterweight 22 to the preset value and in the process of hoisting the weight before the pushing device 23 reduces the moment radius of the super-lift counterweight 22 to the preset value.

For example, in the process of hoisting the weight, the super-lift counterweight 22 and the hoisted weight may be lifted alternately first, until the super-lift counterweight 22 leaves the ground, and after the super-lift counterweight 22 is off the ground, an operation of increasing the amplitude of the super-lift counterweight 22 and an operation of lifting the weight are controlled to be carried out alternately, until the hoisted weight leaves the ground. Moreover, in the process of lifting the super-lift counterweight 22 off the ground, of two conditions that the force F1 on the super-lift pulling member 27 reaches the maximum limit value Fmax and the load rate reaches the maximum value, one that is met first is taken as an ending condition of each operation of lifting the weight, and of two conditions that the force F1 on the super-lift pulling member 27 drops to the minimum limit value Fmin and the stability to resist back tipping moments of the whole machine reaches the specified limit, one that is met first is taken as an ending condition of each operation of lifting the super-lift counterweight. That is, each time the hoisted weight is lifted, if the force F1 on the super-lift pulling member 27 increases to the maximum limit value Fmax or the load rate increases to the maximum value, the current lifting operation for the hoisted weight is stopped and the super-lift counterweight 22 is lifted instead, and when the force F1 on the super-lift pulling member 27 drops to the minimum limit value Fmin or the stability to resist back tipping moments of the machine reaches the specified limit, the current lifting operation for the super-lift counterweight 22 is stopped and the hoisted weight is lifted instead again, and the process is repeated in this way, until the super-lift counterweight 22 leaves the ground. After the super-lift counterweight 22 is off the ground, an operation of increasing the amplitude of the super-lift counterweight 22 and an operation of lifting the weight are controlled to be carried out alternately, until the hoisted weight leaves the ground, and in this process, of the two conditions that the force F1 on the super-lift pulling member 27 drops to the minimum limit value Fmin and the stability to resist back tipping moments of the whole machine reaches the specified limit, one that is met first is taken as an ending condition of each operation of increasing the amplitude of the super-lift counterweight 22, and of the two conditions that the force F1 on the super-lift pulling member 27 increases to the maximum limit value Fmax and the load rate increases to the maximum value, one that is met first is taken as an ending condition of each operation of lifting the weight. That is, in the process after the super-lift counterweight 22 is off the ground until the hoisted weight leaves the ground, the moment radius of the super-lift counterweight 22 is increased (i.e., increasing the amplitude of the super-lift counterweight 22, which is called as amplitude increase of the super-lift counterweight for short), and when the force F1 on the super-lift pulling member 27 drops to the minimum limit value Fmin or the stability to resist back tipping moments of the machine reaches the specified limit, the current amplitude increase operation for the super-lift counterweight 22 is stopped and subsequently the hoisted weight is lifted instead, and after the force F1 on the super-lift pulling member 27 increases to the maximum limit value Fmax or the load rate increases to the maximum value, the current lifting operation for the hoisted weight is stopped and subsequently the amplitude of the super-lift counterweight 22 is increased instead, and the process is repeated in this way, until the hoisted weight leaves the ground.

For another example, in the process that the pushing device 23 reduces the moment radius of the super-lift counterweight 22 to the preset value, an operation of reducing the amplitude of the super-lift counterweight 22 and an operation of lowering the weight may be controlled to be carried out alternately. Moreover, in this process, the condition that the force F1 on the super-lift pulling member 27 drops to the minimum limit value Fmin or the stability to resist back tipping moments of the whole machine reaches the specified limit may be taken as an ending condition of each operation of lowering the weight, and the condition that the force F1 on the super-lift pulling member 27 increases to the maximum limit value Fmax or the load rate increases to the maximum value may be taken as an ending condition of each operation of reducing the amplitude of the super-lift counterweight.

After the hoisted weight is off the ground, the hoisted weight is transferred by the crane 10 to a target placing location, and subsequently the weight is gradually lowered until unloading is completed. It can be understood that the process of lowering the weight includes two processes before and after reducing of the moment radius of the super-lift counterweight 22 to the preset value, wherein the process after reducing the moment radius of the super-lift counterweight 22 to the preset value is the aforementioned engagement process of the balancing mechanism 2*a* and the hovering device 3, the control process of which has been described above and will not be repeated here. The process after the weight is transferred to the target placing location and before the moment radius of the super-lift counterweight 22 is reduced to the preset value is a process of lowering the weight before the balancing mechanism 2*a* is engaged with the hovering device 3, and in this process, an operation of reducing the amplitude of the super-lift counterweight 22 (i.e., reducing the moment radius of the super-lift counterweight 22, or reducing the amplitude of the super-lift counterweight 22 for short) and an operation of lowering the weight may be controlled to be carried out alternately. Moreover, in the alternate amplitude reduction and lowering process, the condition that the force F1 on the super-lift pulling member 27 drops to the minimum limit value Fmin or the stability to resist back tipping moments of the whole machine reaches the specified limit may be used as an ending condition of each operation of lowering the weight, and the condition that the force F1 on the super-lift pulling member 27 increases to the maximum limit value Fmax or the load rate increases to the maximum value may be used as an ending condition of each operation of reducing the amplitude of the super-lift counterweight. That is, after the weight is transferred to the target placing location, the weight is lowered, and when the force F1 on the super-lift pulling member 27 drops to the minimum limit value Fmin or the stability to resist back tipping moments of the whole machine reaches the specified limit, the current lowering operation is stopped and subsequently the moment radius of the super-lift counterweight 22 is reduced instead, and when the force F1 on the super-lift pulling member 27 increases to the maximum limit value Fmax or the load rate increases to the maximum value, the current amplitude reduction operation is stopped and then the weight is lowered again, and the process is so repeated, until the moment radius of the super-lift counterweight 22 is reduced to the preset value to meet the requirement of a hovering working condition.

Next, taking the crane 10 shown in FIGS. 4-10 as an example, the entire work control process of the crane 10 shown in FIG. 13 is described.

The entire work control process of the crane 10 includes four processes performed successively: a super-lift counterweight off-ground process, a weight off-ground process, a super-lift counterweight amplitude reduction process and an unloading and hovering process.

The term "off-ground" refers to a process of separation from a support, which is not limited to leaving the ground 4, but may also be leaving other structures that support the super-lift counterweight 22 and the weight. For example, the expression "super-lift counterweight off-ground" may mean the super-lift counterweight 22 leaves the ground 4, and may also mean the super-lift counterweight 22 leaves the hovering device 3. As another example, the expression "weight off-ground" may mean that the weight leaves the ground 4, and may also mean that the weight leaves other structure that supports the weight.

First, the super-lift counterweight off-ground process is performed. At the beginning of performing a hoisting task by the crane 10, the super-lift counterweight 22 is located on the hovering device 3 or the ground 4, and the hoisted weight is located on the ground 4 or other supporting structure, at this time, the weight is lifted, and when the force F1 on the super-lift pulling member 27 increases to the maximum limit value Fmax or the load rate increases to the maximum value, the lifting operation for the weight is stopped and subsequently changed to lifting the super-lift counterweight 22, and when the force F1 on the super-lift pulling member 27 drops to the minimum limit value Fmin or the stability to resist back tipping moments of the whole machine reaches the specified limit, the lifting operation for the super-lift counterweight is stopped and subsequently changed to lifting the weight again, and the process is so repeated, until the super-lift counterweight 22 leaves the hovering device 3 or leaves the ground 4.

Next, the weight off-ground process is performed. After the super-lift counterweight 22 leaves the hovering device 3 or leaves the ground 4, the moment radius of the super-lift counterweight 22 is increased, and when the force F1 on the super-lift pulling member 27 drops to the minimum limit value Fmin or the stability to resist back tipping moments of the whole machine reaches the specified limit, the amplitude increase operation for the super-lift counterweight is stopped and subsequently change to lifting the weight, and when the force F1 on the super-lift pulling member 27 increases to the maximum limit value Fmax or the load rate increases to the maximum value, the lifting operation for the weight is stopped and changed again to increasing the moment radius of the super-lift counterweight 22, and the process is so repeated, until the weight leaves the ground.

Subsequently, the super-lift counterweight amplitude reduction process is performed. After the weight is off the ground, the weight is transferred to a target placing location, and after the weight is transferred to the target placing location, the weight is lowered, and when the force F1 on the super-lift pulling member 27 drops to the minimum limit value Fmin or the stability to resist back tipping moments of the whole machine reaches the specified limit, the lowering operation for the weight is stopped and changed to reducing the moment radius of the super-lift counterweight 22, and when the force F1 on the super-lift pulling member 27 increases to the maximum limit value Fmax or the load rate increases to the maximum value, the amplitude reduction operation for the super-lift counterweight is stopped and changed to lowering the weight again, and the process is so repeated, until the moment radius of the super-lift counterweight 22 is reduced to the preset value to meet the requirement of a hovering working condition.

Finally, the unloading and hovering process is performed. After the moment radius of the super-lift counterweight 22 is reduced to the preset value, the weight is further lowered, and when the force F1 on the super-lift pulling member 27 drops to the minimum limit value Fmin or the stability to resist back tipping moments of the whole machine reaches the specified limit, the lowering operation for the weight is stopped and changed to lowering the super-lift counterweight 22, and when the force F1 on the super-lift pulling member 27 increases to the maximum limit value Fmax or the load rate increases to the maximum value, the lowering operation for the super-lift counterweight is stopped and changed to lowering the weight again, and the process is so repeated, until the positioning shaft 25 is hooked in place in the hook 32, the super-lift counterweight 22 falls solidly onto the hovering device 3, and the load of the weight is completely removed, so that the crane 10 is in a no-load state and the super-lift counterweight 22 is in a hovering state, and subsequently, the crane 10 can implement traveling and slewing under no load while carrying the super-lift counterweight.

Described above are only exemplary embodiments of the present application, which are not intended to limit the present application, and all modifications, equivalent substitutions and improvements made within the spirit and principle of the present application should be encompassed within the protection scope of the present application.

The invention claimed is:

1. A crane, comprising:

a body, comprising a chassis and a turntable, the turntable being rotatably arranged on the chassis;

a super-lift device, comprising a super-lift jib, a suspension pulling member, and a balancing mechanism, wherein the balancing mechanism comprises a super-lift counterweight and a pushing device, first ends of the super-lift jib and the pushing device are both connected to the turntable, the suspension pulling member is connected to a second end of the super-lift jib and the super-lift counterweight, and a second end of the pushing device is connected to the super-lift counterweight to adjust a distance between the super-lift counterweight and a slewing center of the turntable;

a hovering device configured to support the super-lift counterweight above a ground when the crane is under no load, wherein a first end of the hovering device is connected to the turntable and a second end of the hovering device is not connected to the super-lift jib;

a mast; and a super-lift pulling member, wherein a first end of the mast is connected to the turntable and a second end of the mast is connected to the super-lift jib by the super-lift pulling member, wherein the crane further comprises at least one of the following:

a first detection device configured to detect forces on the suspension pulling member and the hovering device to determine a weight of the super-lift counterweight; or a second detection device configured to detect a force on the super-lift pulling member.

2. The crane according to claim 1, wherein the second end of the hovering device is separably engaged with the balancing mechanism.

3. The crane according to claim 2, wherein the second end of the hovering device is detachably connected to the balancing mechanism.

4. The crane according to claim 3, wherein the second end of the hovering device is provided with a hook, and the hovering device is detachably connected to the balancing mechanism through the hook.

5. The crane according to claim 4, wherein the balancing mechanism comprises a lifting cylinder and a positioning shaft, the lifting cylinder being connected to the super-lift counterweight and driving the super-lift counterweight to ascend and descend, the positioning shaft being arranged on the lifting cylinder and implementing the connection between the balancing mechanism and the hovering device by snapping into the hook.

6. The crane according to claim 4, wherein an opening of the hook faces upward.

7. The crane according to claim 1, wherein the hovering device comprises a support beam, a tray, a connecting rod, or a hovering cylinder.

8. The crane according to claim 1, wherein the first end of the hovering device is hinged to the turntable or the first end of the hovering device is welded to the turntable.

9. The crane according to claim 1, wherein:

the first detection device comprises a tension sensor, a pressure sensor, or an oil pressure sensor.

10. A control method of the crane according to claim 1, comprising:

controlling the pushing device to reduce the distance between the super-lift counterweight and the slewing center of the turntable to a preset value; and controlling the balancing mechanism to engage with the hovering device to support the super-lift counterweight above the ground with the hovering device, so that the crane is capable of slewing or traveling under no load while carrying the super-lift counterweight.

11. The control method according to claim 10, wherein controlling the balancing mechanism to engage with the hovering device comprises:

controlling the super-lift counterweight to fall onto the hovering device; or connecting the second end of the hovering device to the balancing mechanism.

12. The control method according to claim 10, wherein controlling the balancing mechanism to engage with the hovering device comprises:

controlling the super-lift counterweight to fall onto a tray of the hovering device; or controlling a positioning shaft of the balancing mechanism arranged on a lifting cylinder to fall into a hook of the hovering device; or connecting a second end of a connecting rod or a hovering cylinder of the hovering device to the pushing device.

13. The control method according to claim 12, wherein controlling a positioning shaft of the balancing mechanism arranged on a lifting cylinder to fall into a hook of the hovering device comprises:

controlling the lifting cylinder to drive the super-lift counterweight to descend, so that the positioning shaft falls into the hook and snaps into the hook.

14. The control method according to claim 10, wherein in the process of controlling the balancing mechanism to engage with the hovering device, controlling the super-lift counterweight and a weight hoisted by the crane to fall alternately, taking one which is met first of two conditions that a force F1 on a super-lift pulling member of the crane reaches a maximum limit value Fmax and a load rate of the crane reaches a maximum value as an ending condition of each falling process of the super-lift counterweight, and taking one which is met first of two conditions that the force F1 on the super-lift pulling member drops to a minimum limit value Fmin and a stability to resist back tipping moments of the crane reaches a specified limit as an ending condition of each falling process of the hoisted weight, until the balancing mechanism is engaged with the hovering device, the hoisted weight completes falling, wherein the load rate of the crane is a ratio of an actual load of the crane to a rated load of the crane.

15. The control method according to claim 10, wherein in the process of controlling the pushing device to reduce the distance between the super-lift counterweight and the slewing center of the turntable to the preset value, an operation of reducing an amplitude of the super-lift counterweight and an operation of lowering a weight are carried out alternately, taking one which is met first of two conditions that a force F1 on a super-lift pulling member of the crane drops to a minimum limit value Fmin and a stability to resist back tipping moments of the crane reaches a specified limit as an ending condition of each operation of lowering the weight, and taking one which is met first of two conditions that the force F1 on the super-lift pulling member increases to a maximum limit value Fmax and a load rate increases to a maximum value as an ending condition of each operation of reducing the amplitude of the super-lift counterweight, until the distance between the super-lift counterweight and the slewing center of the turntable is reduced to the preset value, wherein reducing the amplitude of the super-lift counterweight is reducing the distance between the super-lift counterweight and the slewing center of the turntable.

16. The control method according to claim 10, comprising:

before controlling the pushing device to reduce the distance between the super-lift counterweight and the slewing center of the turntable to the preset value, lifting the super-lift counterweight off the ground;

wherein in the process of lifting the super-lift counterweight off the ground, controlling the super-lift counterweight and a hoisted weight to ascend alternately, taking one which is met first of the two conditions that a force F1 on a super-lift pulling member of the crane reaches a maximum limit value Fmax and a load rate reaches a maximum value as an ending condition of each operation of lifting the hoisted weight, and taking one which is met first of two conditions that the force F1 on the super-lift pulling member drops to a minimum limit value Fmin and a stability to resist back tipping moments of the crane reaches a specified limit as an ending condition of each operation of lifting the super-lift counterweight, until the super-lift counterweight leaves the ground.

17. The control method according to claim 16, comprising:

before controlling the pushing device to reduce the distance between the super-lift counterweight and the slewing center of the turntable to the preset value, and after lifting the super-lift counterweight off the ground, lifting the hoisted weight off the ground;

wherein in the process of lifting the hoisted weight off the ground, an operation of increasing an amplitude of the super-lift counterweight and an operation of lifting the weight are carried out alternately, taking one which is met first of the two conditions that the force F1 on the super-lift pulling member drops to the minimum limit value Fmin and the stability to resist back tipping moments of the crane reaches the specified limit as an ending condition of each operation of increasing the amplitude of the super-lift counterweight, and taking one which is met first of the two conditions that the force F1 on the super-lift pulling member increases to the maximum limit value Fmax and the load rate increases to the maximum value as an ending condition of each operation of lifting the weight, until the hoisted weight leaves the ground, wherein increasing the amplitude of the super-lift counterweight is increasing the distance between the super-lift counterweight and the slewing center of the turntable.

18. The crane according to claim 1, wherein the second detection device comprises a tenson sensor.

* * * * *